March 17, 1936.  F. E. WEICK ET AL  2,034,218
LATERAL CONTROL FOR AIRPLANES
Filed Nov. 21, 1934   3 Sheets-Sheet 1
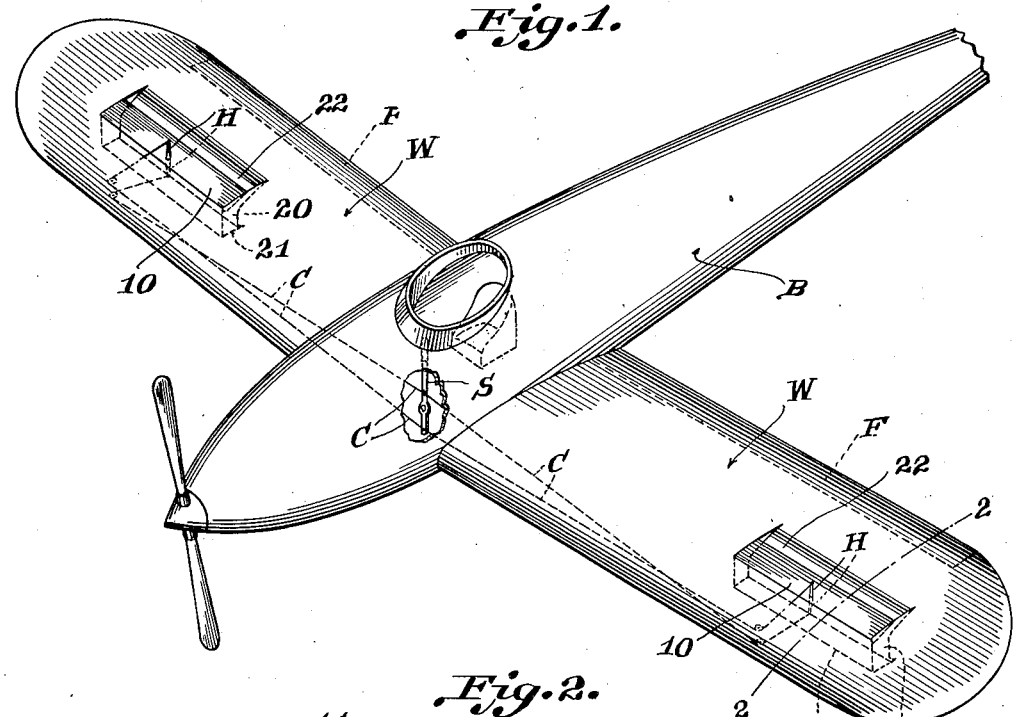
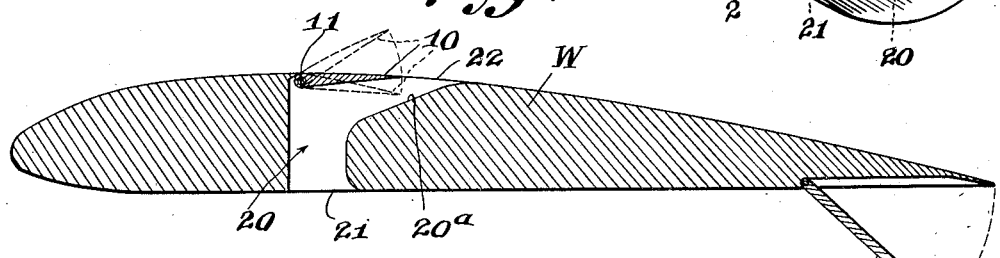
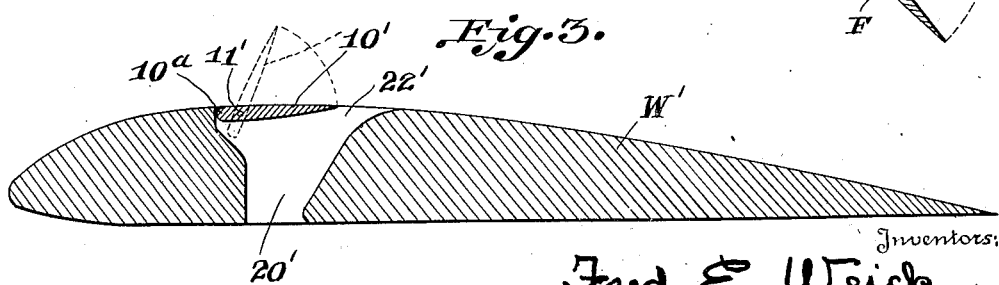

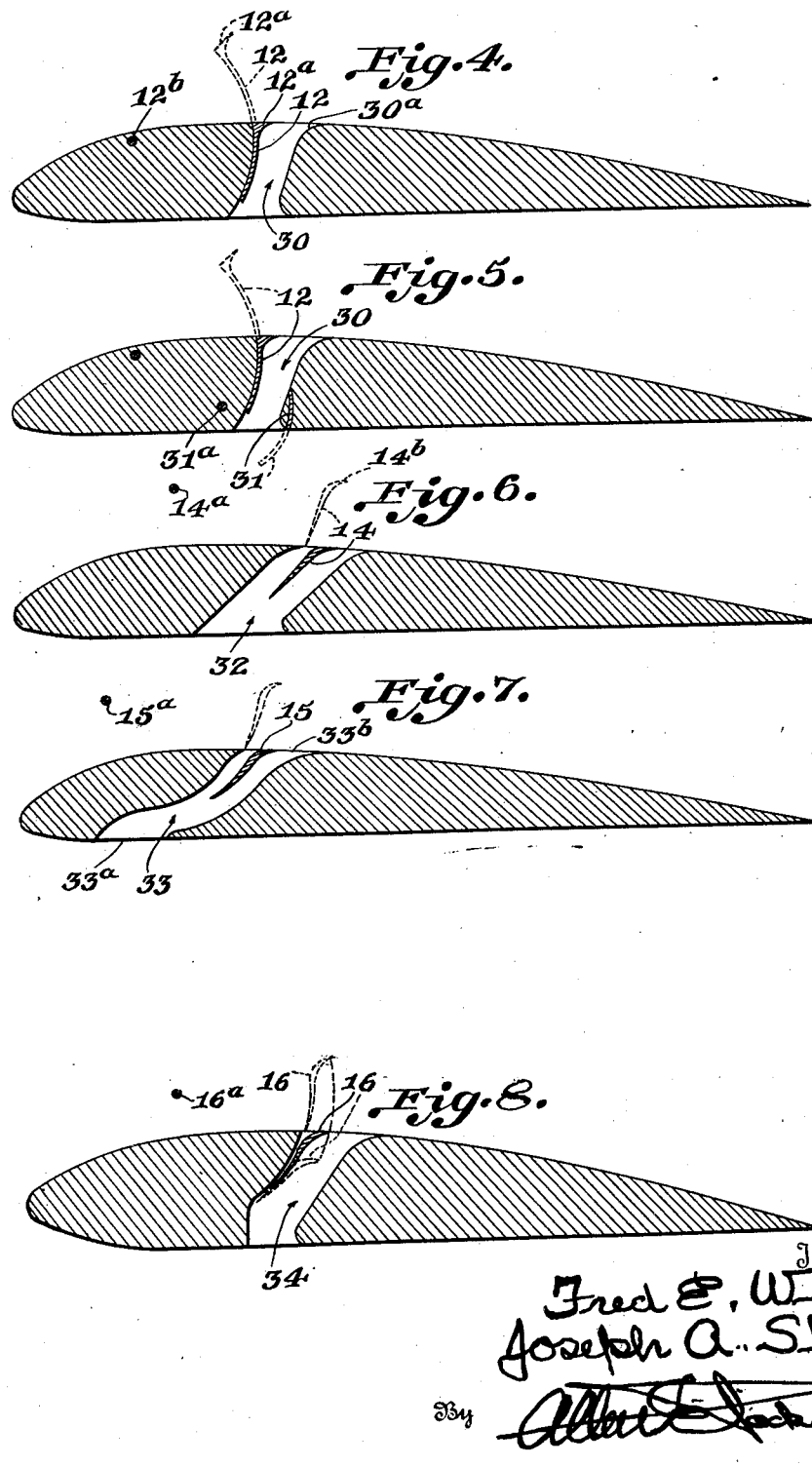

March 17, 1936.  F. E. WEICK ET AL  2,034,218
LATERAL CONTROL FOR AIRPLANES
Filed Nov. 21, 1934   3 Sheets-Sheet 3
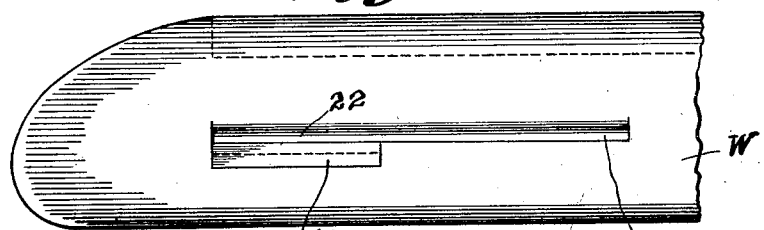
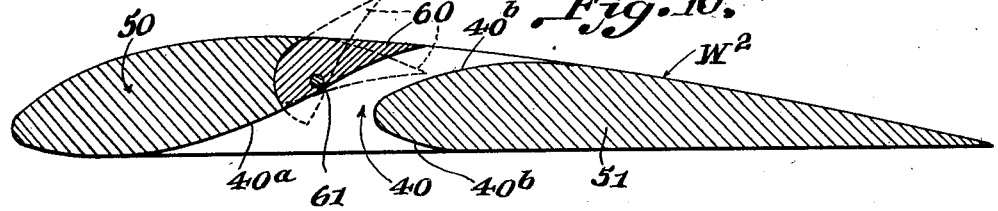
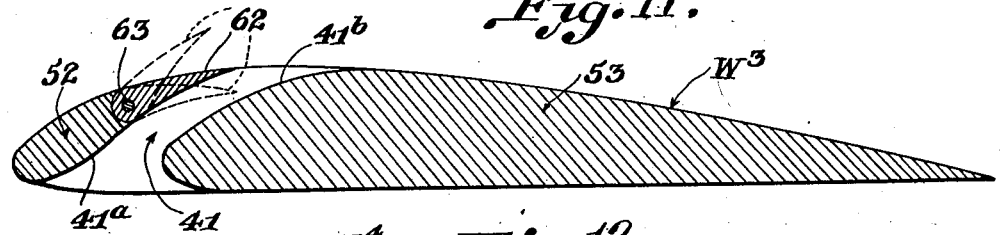
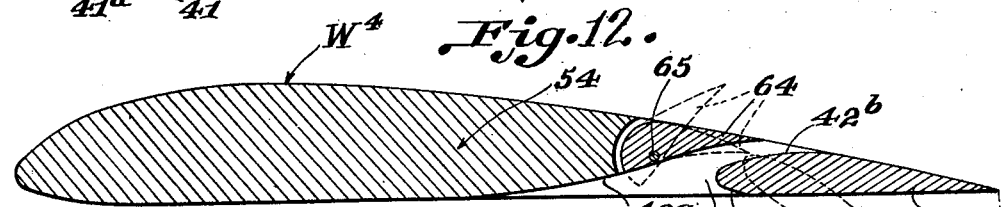
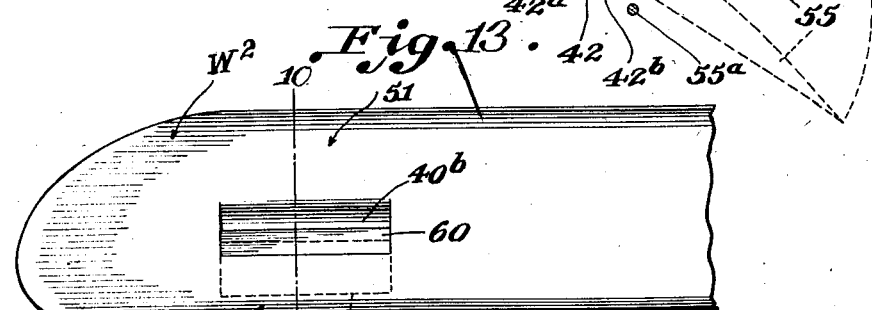
Inventors:
Fred E. Weick
Joseph A. Shortal
By ............
Attorney

Patented Mar. 17, 1936

2,034,218

UNITED STATES PATENT OFFICE 2,034,218

LATERAL CONTROL FOR AIRPLANES

Fred E. Weick and Joseph A. Shortal, Hampton, Va.

Application November 21, 1934, Serial No. 754,162

15 Claims. (Cl. 244—29)

This invention relates to certain improvements in lateral control for airplanes; and the nature and objects of the invention will be readily recognized and understood by those skilled in the aeronautical art in the light of the following explanation and detailed description of the accompanying drawings illustrating what we at present consider to be the preferred embodiments or mechanical and aerodynamic expressions of our invention from among various other forms, designs, arrangements, embodiments and combinations of which the invention is capable within the broad spirit and scope thereof.

The types of lateral or so-called rolling control now in general use for airplanes, have certain inherent characteristics that render such types inefficient and ineffective from the control standpoint, and/or unsatisfactory from the operating standpoint, particularly under certain flight conditions where effective lateral or rolling control of the airplane is highly desirable. Our present invention is primarily directed to the various lateral control problems encountered with airplanes, such as the problems exemplified by the known types of control, and provides a form of lateral control that is efficient and effective throughout the flight range and under the varying conditions of flight, yet presents no structural or mechanical difficulties in mounting or in control operation.

The practically universally accepted and used "aileron" type of airplane lateral control presents certain fundamental lateral control problems of long standing in the art that our present invention has particularly overcome. The usual aileron type of lateral control provides the rear or trailing portions of opposite wings pivoted or hinged to form trailing flaps as control surfaces that are differentially operated to swing vertically in opposite directions for lateral control. Such conventional aileron types of lateral control afford reasonably satisfactory control of an airplane at cruising and high speeds, but only give very weak lateral control at low speeds of an airplane when effective and ample lateral or rolling control is greatly to be desired, especially under certain flight and weather conditions. At angles of attack above the stall the aileron type of control is so ineffective as to be entirely unsatisfactory for lateral control.

Another inherent characteristic and serious disadvantage of the aileron type of lateral control is the production by the control when operated of adverse yawing moments. When the control is actuated and the airplane is caused to roll thereby into a bank with one wing raised and the airplane turning in the direction of the opposite lowered wing, the aileron on the raised wing produces a greater drag than the aileron on the lowered wing, so that the airplane tends to turn in a direction opposite from the direction it should turn to correspond to the direction of the bank.

With the advent of the various types of high or variable lift wings that include the use of trailing wing flaps or other elements or members mounted at or forming portions of the rear or trailing portion of a wing, additional problems are presented by attempts to apply the conventional aileron types of lateral control to such wings. Due to mounting difficulties and interference, both structural and aerodynamic, between ailerons and such other trailing flaps, members or structure, the aileron types of control do not lend themselves efficiently to such advanced types of wings.

A type of lateral control has been devised to overcome certain of the foregoing defects and disadvantages of the aileron types, and one which is adapted to mounting on a wing well forward of the trailing portion and for projection in control positions from the upper surface of a wing. This control is based on the fact that a projection raised from the upper surface of a wing will effect a decrease in the lift of the wing and if located adjacent the leading edge of the wing, the loss in lift coefficient will increase as the angle of attack of the wing is increased. The foregoing form of lateral control is known in the art generally as the "spoiler" type, and when mounted as a lateral control for an airplane with spoilers or projectable members on the upper surfaces of opposite wings for control operation to operate each singly to lower its respective wing, will give lateral control or rolling moments nearly as great at low speeds and high angles of attack as at high speeds and low angles of attack. The spoiler control at the low speeds and high angles of attack is much greater than the control afforded by the aileron type of lateral control at such speeds and attack angles, and an effective and strong control from the spoilers is continued through the stall and at angles of attack above the stall, while the yawing moments produced by the spoilers are in the opposite sense to the adverse yawing moments generated by the conventional type of aileron control.

While the spoiler type of lateral control, as pointed out, eliminates the disadvantages of the aileron type of control and is to such extent superior to the latter control, yet there is an inherent defect and disadvantage in the spoiler control that renders it unsatisfactory and useless as a practical means for laterally controlling an airplane. This defect and disadvantage is due to the delayed action or lag in the lateral control or rolling response of the airplane following operation of the spoilers. We have by research and actual flight tests demonstrated and established not only the extent of such lag but also that the initial response to a control actuation of a spoiler to lower a wing was a movement of the wing in the wrong direction, that is, a raising of the wing, which was then followed by the desired lowering movement of the wing.

Our flight tests established the fact that the interval of lag between the time the control stick of the control system was moved and the time the airplane commenced to roll in the desired direction was a period of the approximate order of one-half (.5) second, with the type of spoiler so tested. Tests in flight also have established that from the control operating or pilot's standpoint, any control response lag greater than one-tenth (.1) of a second, is sufficiently objectionable as to render a lateral control unsatisfactory, and in the higher lag ranges render the control useless as a practical control for an airplane. The lag in control response from a spoiler increases as the position of mounting a spoiler on a wing approaches the forward or leading edge of the wing. The lag was found to be of the order of three-fourths (.75) of a second with the spoiler mounted in the foremost positions near or adjacent the forward or leading edge portion of a wing, and this lag decreased as the spoiler position was moved to the rear on the wing, until at a trailing edge portion of the wing there was zero (0.0) lag.

The main purpose of our invention is to eliminate the lag in the control response from lateral controls of the type in which a projection or control surface is raised from the upper surface of a wing for decreasing the lift coefficient to lower the wing, and particularly to avoid such lag when the control surfaces are positioned on the forward portion of a wing, so as to obtain the advantages of increased and effective control throughout the flight range from low speeds to high speeds as well as at the stall and angles of attack above the stall, and to thereby render such type of lateral control available as a practical and usable airplane control and obtain all of the advantages over the conventional lateral controls as generally referred to hereinbefore.

A lateral control of the invention is basically characterized by a member or structure on a wing that is projectable from a normal or neutral control position at the wing surface to a wing lift changing position projected from the wing surface, and the provision for causing a constant flow of air from the wing in sufficient volume to the rear of said control member or structure and rearwardly therefrom with the normal airflow across the wing surface, both with the control member in neutral position at the wing surface and in projected position from such surface, to the end that control operation of the member may be carried out without objectionable lag in the control response of the wing.

A further object and a feature of the invention resides in the design and mounting of lateral control members or surfaces having the foregoing basic characteristics of the invention on opposite wings of an airplane, and in the design of the wings, to obtain the airflow requirements, and in the arrangement of a control system for selectively operating either of said opposite wing mounted members for the desired lateral control or rolling of the airplane in the desired direction.

Another object of the invention is to design a wing on which a control member or surface of the type of the invention is provided or mounted, to form an air passage or slot therethrough in such relation to the control member as to cause the constant airflow to the rear of the member and in the required volume to carry out the broad principle of lateral control lag elimination of the invention.

With the foregoing general features, characteristics and objects in view, as well as certain others that will be recognized from the following explanation, the invention consists in certain novel features in design and in combination and constructions of parts and elements, all as will be more fully and particularly referred to and specified hereinafter.

Referring to the accompanying drawings, in which similar reference characters refer to corresponding parts and elements throughout the several figures:

Fig. 1 is a perspective view, more or less diagrammatic, of the body and wings of an airplane having a form of lateral control of our invention that includes the opposite wing mounted control surfaces and cooperating wing slots, together with a control operating system, the wings shown being of the variable lift trailing wing flap type.

Fig. 2 is a transverse or chordwise, more or less diagrammatic, vertical section taken as on the line 2—2 through a wing of Fig. 1, to show the lateral control surface and associated wing slot of the form and arrangement of Fig. 1, the control surface being shown in a neutral control position in full lines, and in raised and lowered control positions in dotted lines.

Fig. 3 is a diagrammatic transverse vertical section through a wing having a balanced flap form of lateral control surface of the general type of Fig. 1, and a modified shape of wing passage or slot associated therewith.

Fig. 4 is a diagrammatic section through a wing having a lateral control surface and associated wing slot of our invention, the control surface being of the projectable plate type forming in lowered neutral control position a shape defining wall of the wing slot, the control surface being shown by dotted lines in projected control position.

Fig. 5 is a view of the lateral control and wing slot arrangement of Fig. 4, but with an air flow directing projectable member at the under surface of the wing to the rear of the slot inlet, the flow directing member being shown in normal inactive retracted position in full lines and in projected position by dotted lines.

Fig. 6 is a diagrammatic transverse section through a wing having a lateral control surface or member of another form of projectable plate or surface type and associated wing slot, with the slots of a modified shape from the forms of the preceding figures, the control member being shown by full lines in neutral position and by dotted lines in projected position.

Fig. 7 is a view similar to Fig. 6 of a different form of wing slot having its lower inlet opening substantially forward of its discharge opening through the upper surface of the wing, and the control surface or projectable modified slightly over the member shown in Fig. 6.

Fig. 8 is a diagrammatic view in transverse section through a wing showing another form of control surface and associated slot of the general type of Fig. 4, the control surface being shown in a normal neutral control position by full lines, and in projected control position and in a lowered neutral position in the wing slot by dotted lines.

Fig. 9 is a more or less diagrammatic view in top plan of a portion of a wing having a lateral control of the type of Figs. 1 and 2, but with the wing slot extended along the wing span beyond the span of the lateral control surface.

Fig. 10 is a diagrammatic transverse vertical section, taken as on the line 10—10 of Fig. 13, through a wing showing another design and arrangement of wing and slot with projectable lateral control surface in which the slot is shaped to provide the portions of the wing forward and to the rear of airfoil section with the control surface forming the trailing portion of the airfoil section forward of the slot.

Fig. 11 is a view similar to Fig. 10 of a modified form of the design and arrangement of Fig. 10, with the wing slot located at the forward leading edge portion of the wing.

Fig. 12 is a view similar to Figs. 10 and 11, but with the wing slot located adjacent the trailing portion of the wing and with such trailing portion to the rear of the slot vertically movable as a wing lift varying flap.

Fig. 13 is a top plan view of a wing having the lateral control arrangement as shown in Fig. 10.

We have in Figs. 1 and 2 of the accompanying drawings, somewhat diagrammatically illustrated one possible embodiment of lateral control based on and designed in accordance with the basic principles and the board features of our invention. An application of such lateral control to an airplane is shown in Fig. 1, in which the body or fuselage B and opposite wings W of an airplane are shown having mounted on its opposite wings W, the lateral control surfaces or members 10, respectively of our invention. Each of the lateral control surfaces 10 of this example, is of the flap type and embodies the control member provided thereby as vertically swinging on a horizontal, spanwise axis 11 at the leading edge of the control member. Each control member 10 is mounted on a wing W intermediate the wing leading and trailing edges, and in the upper surface of the wing so as to lie within and form a portion of the wing upper surface when the member or control surface 10 is in a normal neutral control position as shown by full lines in Fig. 2, but upwardly swingable to position projected or raised from the wing upper surface as shown by the dotted line raised position of Fig. 2.

Associated with each lateral control surface or projectable member of our invention, such as the control surfaces 10 of the instant example, is a means for substantially constantly directing a flow of air rearwardly and upwardly from the upper surface of the wing immediately to the rear of such a control surface. In the form of the invention here shown, such means is provided by an air passage or slot 20 through the wing from the under side of the wing to and through the wing upper surface directly to the rear of and substantially coextensive in span with a control surface or member 10. The wing air passage or slot 20 in the embodiment of Figs. 1 and 2 has its opening through the upper surface of the wing of a greater width chordwise of the wing, than the width of the air intake or inlet opening 21 of the slot through the lower surface, and this increased upper end opening of the slot is disposed or extended rearwardly of the wing relatively to the lower surface slot opening.

With the slot 20 so shaped through the wing, a control surface or member 10 is mounted on the wing in and extending rearwardly across the upper surface opening of the slot, but as the chord of the control surface 10 is less than the width of such wing upper surface opening of the slot there is formed a gap 22 which provides an air discharge opening through the wing upper surface directly to the rear of the control surface with such surface in its normal neutral control position as shown by the full line position of control surface 10 in Fig. 2. The rearward widening of the slot 20 in this particular embodiment, takes place in the upper portion or section of the slot and is accomplished by sloping or inclining the upper section of the rear wall 20a of the slot upwardly and rearwardly to the wing upper surface to the rear of control surface 10, so that the slot provides an air passage having its upper portion or section directed rearwardly and upwardly and formed by the wall 20a and the control surface 10 thereabove.

Referring to Fig. 1 of the drawings, a control surface 10 and associated wing slot 20 is provided on each of the opposite wings W adjacent the outer portion or tip of a wing, and pilot controlled means is provided by which the opposite wing lateral control surfaces 10 can be alternately selectively raised or projected from the upper surface of the wing for lateral control. Such lateral control surface actuating means can take the form of any of the conventional and well known means for this purpose, such for example as diagrammatically illustrated in Fig. 1, to include a usual control stick S in the body B mounted for lateral swinging and operatively coupled in the usual manner to the opposite wing lateral control surfaces 10 by the opposite pairs of control cables C. Each pair of control cables C extends out through one of the wings W, respectively, and is connected to the wing control surface 10 by the usual upper and lower control horns or the like H, in such a manner that lateral swinging of the control stick to the right will raise or project the right wing control surface 10 from the wing, while swinging of the control stick to the left will raise or project the left wing control surface 10.

The type of control operating system diagrammatically disclosed in Fig. 1 is such that the opposite control surfaces 10 are simultaneously deflected in opposite directions, that is, when one control is raised the opposite control is lowered from neutral control position, and while the invention is not in any sense limited to such control operation, we have found such opposite control surface deflection preferable. Where the control surfaces are operated so that on projection or raising of one, the control surface on the opposite wing is not moved but remains in neutral, it is found that when the control is moved through neutral, the stopping of the control surfaces at neutral resulted in a roughness or irregularity in the feel of the controls that is objectionable. With the type of control illustrated this condition is not present due to the simultaneous downward deflection of the control surface opposite the raising control surface, so that the stopping of the surfaces in neutral is eliminated and the controls pass smoothly through the neutral position.

It is further preferable to use a type of control operating system in which a downward moving lateral control surface is given but slight downward deflection relative to the upward deflection of the raising control surface, such as indicated in Fig. 2 by the dotted line positions of the control surface 10 raised and lowered from the full line neutral position. Such a type of control operating system can also be so adjusted as to require a very small control force smoothly increasing with the control surface deflection. The control operating system as diagrammatically illustrated in Fig. 1 is to be considered as of the foregoing type in which there is differential deflection of the control surfaces in opposite directions, with upward deflection greater than downward deflection, and as the type is well known in the art, it is not considered necessary to present a detailed structural and mechanical illustration thereof herein.

The lateral control surfaces of our invention, such as the control surfaces 10 of Figs. 1 and 2 are, in accordance with a basic characteristic of our invention, so positioned and associated with the wing passages or slots 20 that these slots are constantly open with the control surfaces in their neutral control positions as shown by full lines in Figs. 1 and 2, as well as in any raised or projected control position, as will be clear from the projected or raised control position thereof shown by dotted lines in Fig. 2. As each slot 20 extends through the wing from the lower side to the upper side of the wing along substantially the full span of a control surface there will be a constant flow of air upwardly through these wing passages or slots from the region of high pressure at the under surface of the wing to the region of lower pressure at the upper surface of the wing. This constant flow of air is discharged from the upper surface of the wing directly to the rear and along the span of the lateral control surfaces or members and is given a rearward directed path of flow into the airflow over the upper surface of the wing. Thus, the airflow to the rear of the control surfaces is established and maintained with these surfaces in neutral so that upon raising or projecting a control surface into control position above the upper surface of a wing there is prevented any establishment of a momentary region of extremely low pressure to the rear or behind the projected control surface to cause lag or delay in the control response from such raised or projected surface.

With the lateral control arrangement of Fig. 1, there is obtained a full and effective control both at low speeds and high angles of attack, and at and beyond stall angles, while this control is obtained substantially without lag notwithstanding the forward location of the control surfaces on the wings. By such forward location of the lateral control surfaces, interference with rear or trailing structure or design of the wing is done away with, and for example, wings of the high or variable lift types such as exemplified by the wings W of Figs. 1 and 2 having the trailing under surface flaps F may be practically and efficiently used and effective lateral control obtained throughout the flight range. In fact, our tests have shown that with wings W of the type having flaps F the rolling moment coefficient given by the control surfaces is substantially increased when the wing flaps are deflected.

The constantly open air passage or slot associated with the control surface of the invention directing the airflow therefrom rearwardly along the upper surface of the wing, increases the angle of attack at which its portion of the wing stalls, and the slot can be extended along the span of the wing beyond the lateral control surface to increase the lift coefficient of the wing, or along the outer portions of the span to improve lateral stability at the higher angles of attack just above the stall of the main portion of the wing. For example, in Fig. 9 we have shown the wing W with the slot 20 extended inwardly along the wing span from the lateral control surface 10 but with the wing upper surface discharge opening or gap of the extended span of the slot of a width corresponding to the width of gap 22 along the control surface when such surface is in neutral position. Such slot 20 can also if desired be extended outwardly along the span from the control surface, as referred to above.

With the control operating system of the type illustrated by Fig. 1 in which upward deflection or projection of one lateral control surface 10 is simultaneously accompanied by downward deflection of the opposite control surface 10 to a lesser degree, it is preferable that the downward deflection be not sufficient to completely close the wing slot 20 against airflow therethrough. The maximum downward deflection may be that indicated by the dotted line lowered position of control surface 10 from its full line position as shown in Fig. 2. However, it is to be noted that complete closing of the wing slot by the downwardly deflected control surface will not have a substantially serious or disadvantageous effect on the wing or lateral control. As long as the slot 20 is open when its associated lateral control surface is in its normal neutral control position so that the airflow is established to the rear of the control surface, the results in control response lag reduction or elimination will be efficiently obtained.

The width of the wing air passage or slot and its discharge gap or opening in the upper surface of the wing to the rear of the control surface, are critical at least to the extent that there must be a sufficient volume of air displaced through the passage or slot to obtain the substantial elimination of or desired reduction in the control response lag. With the particular design and arrangement of wing slot 20 and associated control surface 10, of Figs. 1 and 2, we have determined that the slot gap 22 or the minimum width of slot between the rear portion of the control surface 10 and the portion of the slot wall directly to the rear, should be not less than approximately three per cent (3%) of the chord length of the wing W. The slot 20 of Figs. 1 and 2 may have the width of its air inlet opening through the lower surface of the wing, as in the example here given, approximately six per cent (6%) of the chord length of the wing W, although the inlet width of the slot is not considered as critical as the outlet width.

The slot gap of at least three per cent (3%) of wing W chord length eliminates the lag in control response in the slot and control surface arrangement of Figs. 1 and 2, while the provision of a slot gap of two per cent (2%) was found to reduce the lag to approximately one-tenth (0.1) second, a lag which is not sufficient to be objectionably noticeable in flight control operation. Thus, the foregoing slot gap sizes for the design of Figs. 1 and 2 are indicative for such design, but the essential requirement for any design and arrangement of slot and associated control surface of the invention is for a slot gap of a width sufficient to insure flow of air of a volume with the control surface in neutral control position to eliminate control response lag, or reduce the lag to a time interval at which lag is not practically objectionable.

The position or location of the control surface and air passage or slot combination chordwise or fore and aft of the wing determines the characteristics of the lateral control and wing combination. As indicative of the effects of fore and aft location, with the design and arrangement of Figs. 1 and 2, a location of a control surface 10 with its hinge axis 11 approximately thirty per cent (30%) of the chord length of the wing W to the rear of the wing leading edge, as illustrated in the drawings, the rolling moment coefficient increases in value as the angle of attack of wing W is increased up to the condition of stall, and effective control is maintained well above the stall. The positive yawning moments obtained are also large, which condition is favorable to control at low speeds but unfavorable to acrobatic forms of flight maneuvers. On the other hand, a more rearward location of the control, say with the hinge axis 11 of control surface 10 located to the rear of the wing leading edge a distance approximately equal to fifty-five per cent (55%) of the chord length of wing W, the rolling moment coefficient remains substantially constant up to the stall, which is at an angle of attack of approximately 15°, but in accordance with a basic characteristic of a lateral control of our invention, the yawing moments remain favorable or positive in the proper direction of the rolling control, though these yawing moments are smaller than with the control located in the more forward positions on the wing, such as the "thirty per cent (30%)" position specifically illustrated in Figs. 1 and 2 of the drawings.

The closer the location of the control to the leading edge of the wing the greater the improvement in both the rolling moments and the stability at the lowest speeds and highest angles of attack, but the drag at high speeds is increased and the yawing moments attain high values. As the location of the control is moved toward the rear or trailing portion of the wing, the yawing moments become smaller and the drag decreases, but the control effectiveness and the stability at high angles of attack become less favorable.

Obviously, the fore and aft location of the controls for most efficient results is dependent upon the design of wing and of control surface and associated slot, and we do not intend by the specific relative sizes and locations given as preferable in the particular example of Figs. 1 and 2, to in any way limit the various adaptations and arrangements of the invention in which different conditions and characteristics are encountered. Irrespective of fore and aft location as where sufficient airflow is maintained at the rear of the control surface in neutral position thereof, control response lag is eliminated and control effectiveness is increased with favorable yaw maintained.

Various other forms, designs and arrangements of control surfaces and associated slots embodying the principles and for obtaining the lateral control characteristics and broad results of our invention, all as exemplified by and explained in connection with Figs. 1 and 2 are possible, as will be readily apparent to those skilled in this art. For example, we have shown in Fig. 3 of the drawings, a lateral control surface 10' of the general flap type of Figs. 1 and 2, but with a forwardly extended balance portion 10a, so as to provide a balanced type of control surface to reduce the control force required. The wing slot 20' of Fig. 3 is shaped to increase in width upwardly from the lower surface of the wing W' but in accordance with our invention provides the slot discharge gap 22' in the wing upper surface directly at the rear of control surface 10' and constantly open to direct the required volume of air rearwardly along the wing upper surface following the control principles hereinbefore explained. The lateral control surface 10' is shown in neutral control position in full lines and in raised or projected lateral control position in dotted lines.

Another form and type of lateral control surface or member and associated wing slot is shown in Fig. 4 of the drawings. In this form the lateral control surface 12 is in the form of an arcuate or forwardly curved plate member which in normal neutral control position is retracted within the wing slot 30 disposed along and defining the forward wall of the slot. The control surface 12 may be mounted for vertical swinging from a hinge axis 12b, or in any other desired manner, and is vertically projectable from retracted neutral control position shown in full lines, to lateral control position projected vertically from the upper surface of the wing as shown by dotted lines in Fig. 4. The upper edge portion of the control surface 12 is provided with a rearwardly extended portion 12a having its rear under surface curved so as to form with the rearwardly curved upper portion 30a of the slot 30 the desired shape of slot at the discharge gap to the rear of control surface 12 to properly rearwardly direct the airflow from the slot.

The slot 30 of Fig. 4 is formed in the wing with a slight rearward inclination from the perpendicular and has a slightly enlarged lower intake opening through the lower surface of the wing and is substantially of the same width throughout its major depth between the discharge gap and such lower opening. The slot 30 is constantly open in all positions of the control surface 12 to thereby establish and maintain the airflow directly at the rear of the control surface.

In Fig. 5 of the drawings an example of an arrangement for directing the airflow at the under surface of a wing into the control surface wing slot is shown as applied to a wing having the control surface and wing slot arrangement of Fig. 4. For instance a forwardly curved plate 31 is mounted in the wing at the rear of the wing slot 30 for swinging from and about an axis 31a, to projected position extended from the wing lower surface into the airflow and forming in effect a downward continuation of the rear wall of the slot. The projected position of plate member 31 is shown in dotted lines, and when so projected the member forms a wall directing and forcing the airflow up into the wing slot 30. Such member is preferably synchronized with the control surface 12 for projection upon projection of such surface, and retraction into the wing when the control surface is lowered to neutral control position. Such a member can take various forms and can be embodied with any of the control surface and slot arrangements of the invention, if desired or found expedient.

A control surface or member 14 of the projectable plate type is also shown in Fig. 6 of the drawings, but in association with a rearwardly inclined slot 32. Such control surface 14 is mounted for swinging about a hinge axis 14a, and in normal retracted and neutral control position as shown in full lines, is disposed in the slot 32 spaced from the slot forward and rear walls. In projected control position the control member 14 swings to position with its lower edge at and along the upper edge of the slot forward wall to thereby open the full width of the discharge gap of the slot to the rear of the projected control surface, as shown by dotted lines in Fig. 6. The control surface or member 14, preferably has its upper edge portion 14b curved rearwardly to assist in rearwardly directing the airflow from the slot 32.

A form of wing slot 33 is shown in Fig. 7 in which the inlet opening 33a of the slot through the lower surface of the wing is spaced a considerable distance forward of the discharge opening or gap 33b through the upper surface of the wing. The slot 33 curves upwardly and rearwardly through the wing and a control surface 15 of the general type and mounting of control surface 14 of Fig. 6 is provided for swinging about a hinge axis 15a, from retracted neutral control position in the slot, shown by full lines, to projected control position shown by dotted lines in Fig. 7. The shape and arrangement of slot 33 with its forwardly spaced lower intake opening 33a tends to give a better compromise of the stability and control characteristics hereinbefore discussed in detail.

In Fig. 8 we have shown a modified shape of slot and associated control surface in which the latter is positioned at and defines the forward wall of the slot in retracted position, of the general type of arrangement shown in Fig. 4 of the drawings. In the form of Fig. 8, the slot 34 is substantially perpendicular at its lower intake portion and then extends rearwardly and upwardly through the wing. The lateral control surface or member 16 is of the plate type swingable about the hinge axis 16a, and in retracted normal neutral control position, shown in full lines, is disposed at and forms the forward wall of the rearwardly inclined portion of slot 34. The member 16 is shown by dotted lines in projected control position and also by dotted lines in downwardly deflected position where operated by the differential type of operating system, such as exemplified in Fig. 1.

We have in Figs. 10 to 13 of the accompanying drawings expressed the broad principles and features of lateral control of our invention, by forms in which the portions of a wing forward and to the rear and along the span of an associated control surface and slot are given an airfoil section, with the control surface providing the trailing portion of the forward airfoil section forming portion of the wing. For instance, we have shown in Figs. 10 and 13, a wing W² having the lateral control slot 40 therethrough with the forward wall 40a of the slot so curved upwardly and rearwardly as to form with the wing upper surface contour an airfoil section for that portion 50 of the wing forward and along the span of the control slot 40. The rear surface or wall 40b of slot 40 is curved first upwardly and forwardly from the wing lower surface, and then is curved upwardly and rearwardly to the wing upper surface, to define and form the portion 51 of the wing to the rear of slot 40 as of airfoil section of a span substantially coextensive with the span of the slot, as clearly shown by Fig. 10.

The rear or trailing portion of the forward airfoil section 50 of the wing is pivoted for vertical swinging on an axis 61 and thus provides the lateral control surface in association with the constantly open slot 40, all in accordance with the basic principles of the invention as hereinbefore explained. In normal neutral control position of surface 60, shown by full lines in Fig. 10, the slot 40 is open and maintains the airflow at the rear of the control while in raised control position of control surface 60, shown by dotted lines in Fig. 10, the slot discharge gap opening is increased and the airflow is directed along and to the rear of the control surface. The downward deflection of control surface 60 in a differential control operating system is also shown by dotted lines in Fig. 10, and in deflected position the control surface preferably should not completely close slot 40.

In Fig. 11, an arrangement in all respects similar to Figs. 10 and 13, is shown but with the slot 41 positioned substantially adjacent the leading edge of wing W³ and having the slot for wall 41a and rear wall 41b so shaped as to provide the portion 52 of the wing forward of slot 41 as of airfoil section, and the portion 53 of the wing to the rear of the slot as of airfoil section. The trailing portion 62 of the forward airfoil section 52 provides the lateral control surface in association with the slot and vertically swingably mounted on the hinge axis 63.

An arrangement locating a control slot 42 adjacent the trailing portion of the wing W⁴ is shown in Fig. 12. In this form the forward wall 42a of the slot 42 is shaped to form the portion 54 forward of the slot as of airfoil section, and the rear wall 42b of the slot is curved and shaped to form the trailing portion 55 of the wing to the rear of the slot as of airfoil section. The trailing portion of the airfoil section forward portion 54 of wing W⁴ is vertically swingable mounted to form the lateral control surface 64 associated with slot 42 and having a hinge axis 65. In accordance with this form of the invention, the airfoil section trailing portion 55 of the wing to the rear of slot 42 is mounted for vertical swinging in any suitable manner about a hinge axis indicated at 55a. The trailing portion 55 thus forms a lift varying wing flap which in normal raised position is shown in full lines, and in lift increasing downwardly swung or lowered position is shown in dotted lines. Also the differentially deflected downward position of the control surface 64 in the slot is shown by dotted lines, and if desired the control may completely close off the slot when so deflected.

The forms and adaptations of the invention exemplified by Figs. 10 to 13, by forming the wing portions forward and to the rear of a lateral control slot, of airfoil section, if properly formed with regard to profile and aerodynamic interference, decrease the drag of the wing at the control location and tend to improve stability at the low speeds and high angles of attack.

While in all the forms of our invention disclosed as examples herein, we have provided wing slots or passages for establishing and maintaining the airflow at the rear of a control surface, other means may be provided for forcing and discharging air at the desired portions of the wing upper surface, and we do not intend by the present disclosures to limit the invention to slots as shown or to exclude any other broadly equivalent air flow producing means or mechanism. Also, we have used the term "lateral control surface" or "lateral control member" herein and in the appended claims, in a broad generic sense to include any surface or member projectable or raisable into the airflow about the wing for the purpose of decreasing the wing lift for control purposes.

It is also further evident that various changes, modifications, variations, substitutions, eliminations and additions might be resorted to without departing from the broad spirit and scope of our invention, and hence, we do not wish to limit our invention in all respects to the exact and specific disclosures hereof.

What we claim, is:

1. In a lateral control, a wing having a continuously open slot therethrough disposed spanwise thereof with the discharge opening of the slot through the upper surface of the wing, and a lateral control member vertically swingably mounted on the wing extending rearwardly across the slot discharge opening in the wing upper surface to form a portion of the normal wing upper surface with the control member in lowered neutral control position, said control member having a chord less than the width of the slot discharge opening whereby said slot with the control member in neutral control position maintains a flow of air at the upper surface of the wing directly at the rear of said lateral control member, and said control member swingable upwardly from neutral to lateral control position projected from the wing upper surface and increasing the width of the slot discharge opening through the upper surface of the wing.

2. In a lateral control, a wing having a continuously open spanwise slot therethrough from the lower surface to and discharging through the upper surface of the wing, the forward and rear walls of said slot so shaped as to form the portions of the wing forward and to the rear of the slot, respectively, of airfoil section, the trailing portion of the airfoil section of the wing forward of the slot vertically swingably mounted to provide a lateral control surface having its lower side forming and defining a portion of the slot and with the wing slot discharging through the upper surface of the wing along the rear of said control surface, and said lateral control surface in normal neutral control position having its trailing edge spaced from the rear wall of the slot to maintain the slot open through the wing upper surface.

3. In a lateral control, a wing having a spanwise slot therethrough discharging through the upper surface of the wing, a lateral control member of the vertically disposed plate type mounted on the wing within said slot for vertical movement between retracted neutral control position within the slot and lateral control position projected vertically from the slot and outwardly from the upper surface of the wing, said member so mounted relative to the slot discharge that in all positions of the member the slot is open for constantly discharging a flow of air at the rear of said member, and the said member formed to increase the size of the slot discharge opening with the member in a projected control position.

4. In an aircraft lateral control, a wing having a continuously open spanwise slot therethrough from the lower surface to and discharging through the upper surface of the wing, the forward and rear walls of the slot so shaped as to merge with the normal wing upper and lower surfaces and form the portions of the wing forward and to the rear of the slot, respectively, of airfoil section, the trailing portion of the airfoil section of the wing forward of the slot mounted to provide a lateral control surface movable between normal neutral control position forming portion of the normal wing upper surface contour and control position projected from the wing upper surface, said lateral control surface having its trailing edge spaced from the slot rear wall in all positions of the control surface, both neutral and projected, whereby the slot is continuously open and discharges through the upper surface of the wing along and to the rear of said lateral control surface in all positions of the latter, and the airfoil section portion of the wing to the rear of said slot mounted for vertical displacement relative to the wing.

5. In an aircraft lateral control, a wing having a constantly open slot therethrough disposed spanwise thereof with the discharge opening of the slot through the upper surface of the wing, a lateral control member mounted at and across the upper discharge end of said slot for vertical swinging between normal neutral control position forming a portion of the normal upper surface contour of the wing and control positions projected from the upper surface of the wing, said lateral control member in neutral control position having its trailing edge spaced from the rear wall of the slot to form a gap for discharge of air through the slot along and to the rear of the control member with the latter in neutral control position, and in projected lateral control positions said control member increasing the slot discharge opening, through the upper surface of the wing.

6. In an aircraft lateral control, a wing having a constantly open slot therethrough from the lower side of the wing to and discharging through the upper surface of the wing, a lateral control surface mounted over and across the forward portion of the slot discharge opening and movable between normal neutral control position forming a portion of the normal wing upper surface and control positions projected from such surface, and said control surface of less chord than the width of the discharge opening of said slot through the wing upper surface to form a continuously open discharge gap from said slot along and to the rear of said control surface in all positions, both neutral and projected, of the said surface.

7. In an aircraft lateral control, a wing having a constantly open air displacement slot therethrough discharging through the upper surface thereof, a lateral control surface pivotally mounted on the wing for vertical swinging between normal neutral positions at the wing upper surface and control positions projected outwardly from the wing upper surface, said control surface in lowered neutral control positions extending rearwardly across and closing a portion of said slot with its trailing edge spaced from the rear wall of the slot to form an air discharge opening through the wing surface along and at the rear of the control surface, and said lateral control surface when swung upwardly from the wing surface to lateral control positions increasing the air discharge opening of the slot through the wing upper surface.

8. In a control for aircraft, a wing having a slot therethrough discharging through a surface of the wing, a control member movably mounted in the slot and forming a portion of the slot walls, said control member in normal neutral control positions disposed in the slot and within the normal wing contour and movable outwardly from the slot to control positions projected from the wing upper surface, said member in projected positions increasing the size of the slot discharge through the wing surface and said slot continuously open through the wing surface along and to the rear of said control member in all positions of such member.

9. In a lateral control for aircraft, a wing having a slot extending upwardly therethrough and discharging through the upper surface of the wing, a lateral control member in the form of a vertically disposed plate mounted in said slot for vertical movements between normal neutral control positions within the slot and control positions projected from the slot and the wing upper surface, said plate in neutral control positions disposed within the slot and forming a wall portion thereof with the slot continuously open and unobstructed along and to the rear of the plate through the wing upper surface, and in projected lateral control positions said member increasing the size of the slot discharge with the discharge unobstructed rearwardly at and along said plate lateral control member.

10. In a lateral control for aircraft, a wing having a slot therethrough discharging through the upper surface of the wing, a lateral control surface in the form of a vertically disposed plate member mounted in said slot for vertical movements between normal neutral control positions within the slot and control positions projected from the slot and the wing upper surface, said plate member having the upper portion of its rear surface upwardly and rearwardly curved and in normal neutral control positions disposed within and partially closing the slot with such member forming a forward wall of the slot the slot open through the wing upper surface along and to the rear of said plate member, and the said plate member in control positions extended from the slot increasing the size of the slot opening through the wing upper surface forming a substantial vertical continuation of the forward wall of the slot with the slot unobstructed and open through the wing upper surface at and along the rear of the lateral control surface forming plate member.

11. In an aircraft lateral control, a wing having a continuously open slot therethrough disposed spanwise thereof with the discharge opening of the slot through the upper surface of the wing, a lateral control member mounted at and across the upper discharge end of said slot for vertical swinging between normal neutral control position forming a portion of the normal upper surface contour of the wing and control positions projected from the upper surface of the wing, said lateral control member in neutral control position terminating with its trailing edge spaced from the rear wall of the slot to form a gap for discharge of air through the slot along and to the rear of the control member, the control member when swung upwardly to lateral control positions increasing the slot discharge opening along and to the rear of the control member, and the said slot through the wing extended along the span of the wing beyond said control member with the discharge opening of the extended slot through the upper surface of the wing having a width substantially corresponding to the width of the gap along the rear of the control member with the latter in normal neutral position.

12. In an aircraft lateral control, a wing having a continuously open slot therethrough to and discharging through the upper surface of the wing, a lateral control surface over and across the forward portion of the slot discharge opening at the upper surface of the wing, said control surface disposed in normal position with its leading edge along and adjacent the upper portion of the forward wall of the wing slot and pivotally mounted for vertical swinging about an axis spaced rearwardly from the control surface leading edge whereby a balance portion is formed extended forwardly from said axis, and said control surface of less chord than the width of said slot to form a continuously open discharge gap from said slot along and to the rear of the control surface, the upward swinging of said surface from normal position to projected control positions increasing the width of the continuously open slot discharge along the rear of the control surface.

13. In a control for aircraft, a wing having a continuously open air displacement passage extending upwardly therethrough from the lower surface to and opening through the upper surface of the wing, the upper portion of the rear wall of said passage inclined rearwardly and upwardly to increase the width of the passage opening through the upper surface of the wing, a control surface mounted at the upper surface opening of the wing with its leading edge adjacent and along the forward wall of the passage, the control surface extended rearwardly over and across the passage opening in normal position to form an upper wall of the passage and having a chord less than the width of the passage opening in the wing upper surface whereby a continuously open discharge gap is formed along and to the rear of the control surface, and said control surface pivotally mounted along an axis adjacent the leading edge thereof for upward swinging from normal position to control positions projected from the wing and increasing the width of the passage discharge gap through the wing upper surface along and to the rear of the control surface.

14. In a control for aircraft, a wing having a constantly open slot therein for continuous flow of air upwardly therethrough from the under surface to the upper surface of the wing, a control member mounted in and forming a portion of the wall of said slot and movable between neutral position in the slot within the normal contour of the wing and control positions projected from the slot at the upper surface of the wing, said member in neutral position partially closing the slot with the slot discharge open through the upper surface of the wing at and along the rear of said member, and the said member in projected control positions increasing the size of the slot discharge through the wing upper surface to the rear of the projected member.

15. In an aircraft control, a lift surface having a constantly open slot extending therethrough from the under side to and opening through the upper side of the surface for continuous flow of air upwardly therethrough, a control surface mounted on the lift surface for movement between neutral positions and control positions projected outwardly from the upper side of the lift surface, said control surface in neutral positions partially closing the slot with the slot discharge open at the upper side of the lift surface to the rear of said control surface, and said control surface in control positions projected outwardly from the upper side of the lift surface increasing the size of the slot discharge at the upper side of the lift surface, whereby said constantly open slot continuously discharges air at the upper side of the lift surface at and to the rear of the control surface in all positions of such surface.

FRED E. WEICK.
JOSEPH A. SHORTAL.